United States Patent
Helms et al.

(10) Patent No.: US 9,002,722 B2
(45) Date of Patent: *Apr. 7, 2015

(54) LIFECYCLE OBSOLESCENCE FORECASTING TOOL

(75) Inventors: William E. Helms, Fife, WA (US);
Bobby Gene Bradley, Jr., Athens, AL (US); Courtney LeeAnne Matzkind, Huntsville, AL (US); David Michael Matlock, St. Louis, MO (US); Kerry Hale Burden, Harvest, AL (US); Charles V. Bauerle, Madison, AL (US)

(73) Assignee: The Boeing Company, Chicago, IL (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/323,307

(22) Filed: Dec. 12, 2011

(65) Prior Publication Data
US 2013/0151308 A1 Jun. 13, 2013

(51) Int. Cl.
*G06Q 10/08* (2012.01)
*G06Q 10/04* (2012.01)

(52) U.S. Cl.
CPC .............. *G06Q 10/04* (2013.01); *G06Q 10/087* (2013.01)

(58) Field of Classification Search
CPC ..... G06Q 10/00; G06Q 10/08; G06Q 10/087; G06Q 10/0875
USPC ........................ 705/7, 7.12, 7.14, 7.15, 28, 29
See application file for complete search history.

(56) References Cited

U.S. PATENT DOCUMENTS

| | | | |
|---|---|---|---|
| 5,608,621 A * | 3/1997 | Caveney et al. | 705/7.25 |
| 6,338,045 B1 * | 1/2002 | Pappas | 705/29 |
| 6,580,982 B2 * | 6/2003 | Sinex | 701/29.3 |
| 2001/0032103 A1 * | 10/2001 | Sinex | 705/4 |
| 2003/0101107 A1 * | 5/2003 | Agarwal et al. | 705/28 |
| 2005/0071317 A1 * | 3/2005 | Chandrashekhar et al. | 707/2 |
| 2006/0047479 A1 * | 3/2006 | Desai et al. | 702/183 |
| 2006/0047559 A1 * | 3/2006 | Jacoby et al. | 705/10 |

(Continued)

FOREIGN PATENT DOCUMENTS

WO WO2011058076 * 5/2011 ............. G06Q 10/00

OTHER PUBLICATIONS

Brown and Rodgers, A Bayesian Approach to Demand Estimation and Inventory Provisioning, effective publication date: Jul. 1972; All pages.*

(Continued)

*Primary Examiner* — Justin M Pats
*Assistant Examiner* — Venay Puri
(74) *Attorney, Agent, or Firm* — Yee & Associates, P.C.

(57) ABSTRACT

A lifecycle obsolescence forecasting system. The system may include a data integrator configured to receive part information for a plurality of parts. The system may include a sustainability optimizer configured to receive one or more sustainability requirements for a part in the plurality of parts. The system may include a forecaster coupled to the data integrator and the sustainability optimizer, wherein the forecaster may be configured to analyze the part information and the one or more sustainability requirements to establish a component stock-out date for the part, wherein the component stock-out date may comprise a date when a last spare of the part is forecast to be removed from stock, and wherein the component stock-out date may be established as a function of at least the part usage rate and a corresponding failure rate of the part.

20 Claims, 11 Drawing Sheets

(56) References Cited

U.S. PATENT DOCUMENTS

2007/0112487 A1* 5/2007 Avery et al. .................. 701/35
2011/0213636 A1* 9/2011 Sakuma ...................... 705/7.25
2013/0073419 A1* 3/2013 Marwedel et al. .......... 705/26.5

OTHER PUBLICATIONS

Powell and Lutz, Optimum Spares Provisioning Method for Electronic Equipment/ Systems, effective publication date: Feb. 1970, All pages.*

"The Smart DMS/MS Solution!", Resource Analysis Corporation, retrieved Nov. 22, 2011, 2 pages, http://mysmart-rac.com/rac/smartProduct.htm.

"Total Parts Plus", Total Parts Plus, Inc., retrieved Nov. 22, 2011, 3 pages, http://home.totalpartsplus.com/products/parts-plus/.

Osterman et al., "Simulation Improved Testing of Electronic Hardware", 2002 Proceedings of the 48th ATM, Apr. 1, 2002, pp. 1-19.

Cunningham et al., "A Demonstration of Virtual Qualification for the Design of Electronic Hardware", IEST Conference, Apr. 24, 2001, pp. 1-13.

"MOCA—Mitigation of Obsolescence Cost Analysis", CALCE Electronic Systems Cost Modeling Laboratory, University of Maryland, retrieved Dec. 3, 2011, 2 pages, http://www.calce.umd.edu/PASES/MOCA_brochure1.pdf.

"MOCA—Mitigation of Obsolescence Cost Analysis", CALCE Electronic Systems Cost Modeling Laboratory, University of Maryland, retrieved Dec. 3, 2011, 2 pages, hhttp://www.enme.umd.edu/ESCML/Papers/MOCA_brochure.pdf.

Sandborn et al., "Forecasting Technology Insertion Concurrent with Design Refresh Planning for COTS-Based Electronic Systems", Proceedings Reliability and Maintainability Symposium, Jan. 2005, pp. 1-6.

"Resources", AVCOM Software, retrieved Dec. 3, 2011, 2 pages, https://downloads.mtifwb.com/resources/.

European Search Report, dated Mar. 22, 2013, regarding Application No. EP12196517.2, 6 pages.

Romero Rojo et al., "Obsolescence management for long-life contracts: state of the art and future trends," The International Journal of Advanced Manufacturing Technology, vol. 49, Nos. 9-12, Aug. 2010, pp. 1235-1250.

* cited by examiner

FIG. 4

Legend:
- PARTS ENGINEERING HASH TYPE "A" — 402
- SUPPLIER MANAGEMENT HASH TYPE "B" — 404
- RESPONSIBLE ENGINEER HASH TYPE "C" — 406
- LOGISTICS HASH TYPE "D" — 408

400 — DATA ENTRY form (412)

Fields (410):
- COMPONENT STOCK-OUT DATE: 01/01/3000
- SUPPORT REVIEW DATE: 01/01/3000
- PART NAME
- DRAWING PART NUMBER
- BUILD FROM PART NUMBER
- ALTERNATE PART NUMBER
- SUPERSEDED PART NUMBER
- SUPERSEDING PART NUMBER
- AVG RTAT (DAYS)
- USAGE/YEAR (UNITS)
- AVG MTBUR (DAYS)
- AVG MTBUR (HOURS)
- FAILURE OR USAGE DATA — ACTUAL OR CALCULATED
- SPARES ON HAND
- REPAIRABLE?

- ORIG. EQUIP. MANUFACTURER (OEM)
- OEM CAGE CODE (414)
- CURRENT SUPPLIER
- SUPPLIER CAGE CODE
- ALTERNATE SUPPLIER
- ALT. SUP. CAGE CODE
- ESTIMATED UNIT PRICE
- DATE SURVEY SENT
- DATE SURVEY RETURNED
- NEXT SURVEY DUE
- END OF PRODUCTION
- END OF REPAIR SUPPORT
- SUPPLIER REPLACEMENT PART NUMBER
- LOCATION OF SPARES
- LOCATION 1
- LOCATION 2
- LOCATION 3
- LOCATION 4
- LOCATION 5
- LOCATION 6
- LOCATION 7
- LOCATION 8
- LOCATION 9

- ESR OR RFP NUMBER(S)
- LAST UPDATE: 12/31/2009
- UPDATED BY
- ACTION TAKEN AT LAST UPDATE
- FOLLOWUP DATE: 12/31/2009
- ACTION POC
- NEXT ACTION REQUIRED
- PERIODIC REVIEW CYCLE
- NEXT PERIODIC REVIEW: 12/31/2009
- SPECIFY IF OTHER REVIEW CYCLE
- SOFTWARE USED WITH PART
- SOFTWARE DESCRIPTION
- ENGINEERING SOLUTION
- SOLUTION DESCRIPTION/NOTES

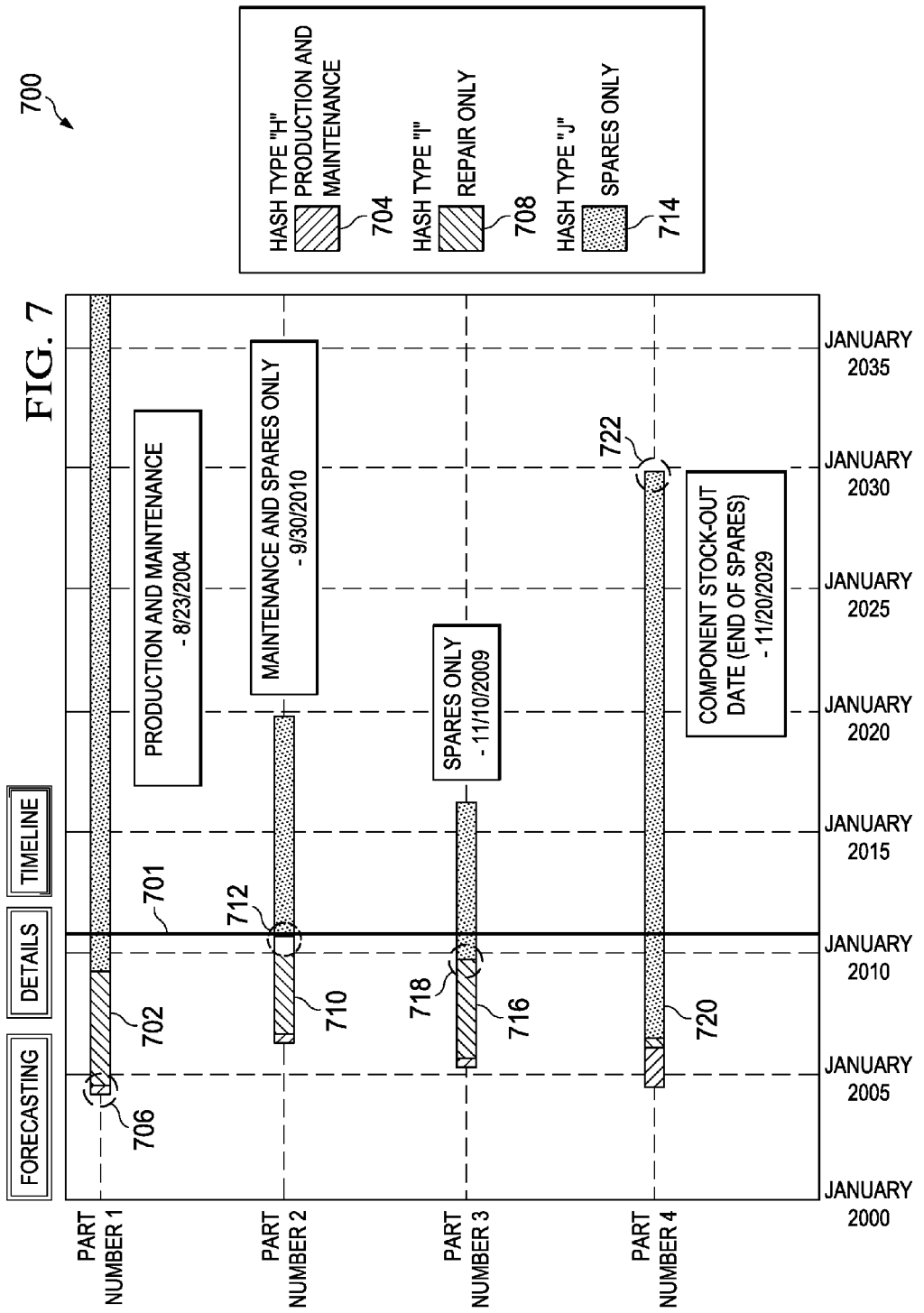

NUMBER OF RECORDS TO DISPLAY [25] [REFRESH]    EXPORT TO SPREADSHEET | LOFT (FORECASTING TOOL)    PARTS 1 - 25 OF 63

806 {

802 {

| | PART NUMBER | DMS | NOMENCLATURE | PROGRAM | SITE | STORE | QUANTITY ON HAND | SUPPLIER | WORK ORDER COUNT | CURRENT STATUS | MITIGATION TYPE | MITIGATION PLAN |
|---|---|---|---|---|---|---|---|---|---|---|---|---|
| 1 | ###-### | 5 | RESISTOR | | | | 0 | MANUFACTURER/ SUPPLIER | 4 | MITIGATION PLAN | 804 — ALTERNATE | DETAILED MITIGATION PLAN |
| 2 | ###-### | 5 | RESISTOR | | | | 0 | MANUFACTURER/ SUPPLIER | 2 | MITIGATION PLAN | DESIGN OUT (REDESIGN CCA) | DETAILED MITIGATION PLAN |
| 3 | ###-### | 5 | RESISTOR | | | | 0 | MANUFACTURER/ SUPPLIER | 1 | MITIGATION PLAN | PART NOT YET OBSOLETE | DETAILED MITIGATION PLAN |
| 4 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |
| 5 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |
| 6 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |
| 7 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |

TO FIG. 8B

FROM FIG. 8A

| | | | | | | | | | |
|---|---|---|---|---|---|---|---|---|---|
| 8 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |
| 9 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |
| 10 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |
| 11 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |
| 12 | ###-### | 5 | RESISTOR | | | | 0 | MANUFACTURER/ SUPPLIER | 0 | MITIGATION PLAN | DESIGN OUT (REDESIGN CCA) | DETAILED MITIGATION PLAN |
| 13 | ###-### | 5 | RESISTOR | | | | 0 | MANUFACTURER/ SUPPLIER | 0 | MITIGATION PLAN | MITIGATED CONSUMABLES | DETAILED MITIGATION PLAN |
| 14 | ###-### | 5 | RESISTOR | | | | 0 | MANUFACTURER/ SUPPLIER | 0 | MITIGATION PLAN | MITIGATED CONSUMABLES | DETAILED MITIGATION PLAN |

FIG. 8B

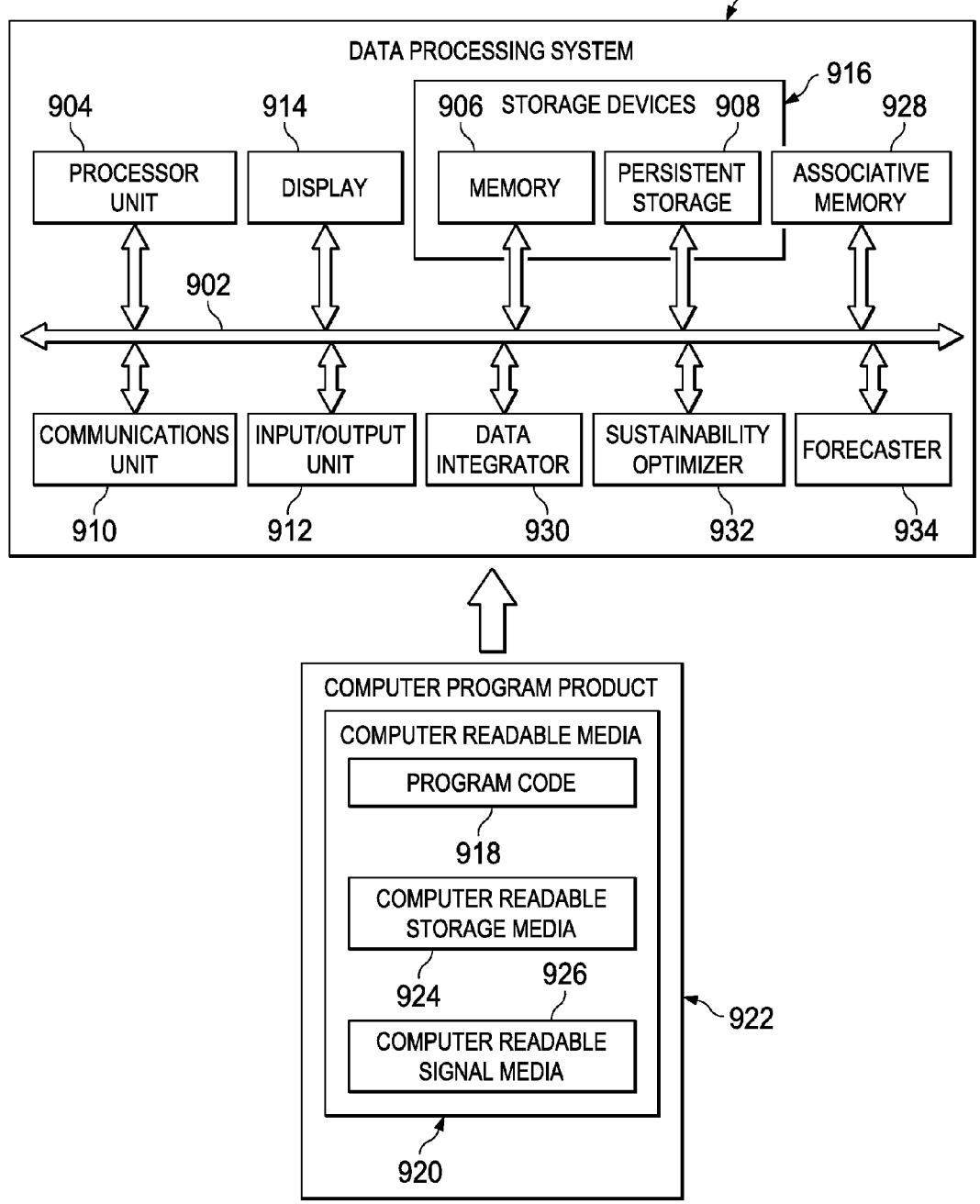

LIFECYCLE OBSOLESCENCE FORECASTING TOOL

GOVERNMENT LICENSE RIGHTS

This application was made with United States Government support under contract number F33657-01-D-0013 (Heffron) HQ0147-09-C-00007 awarded by Missile Defense Agency, United States Air Force. The United States Government has certain rights in this application.

BACKGROUND INFORMATION

1. Field

The present disclosure relates generally to a tool for analyzing a system and its particular parts, given specific data on the system, the particular parts, and their usage, in order to provide a total picture on the sustainability of a system.

2. Background

Parts management may be a difficult task, particularly for a manufacturer or operator maintaining a complex system, such as an aircraft. For example, an operator may track not only hundreds of thousands of different parts for any given aircraft but also may track hundreds or even thousands of aircraft.

To complicate matters, manufacturers regularly may end production of any given system, and the manufacturer also may end production of parts for the given system. In other cases, a part manufacturer may be different than the system manufacturer, in which case the part manufacturer may end production of the part at any time, possibly without warning to the system manufacturer or system operator. Eventually, the manufacturer of a part may cease support for repairs to parts for the given system. An operator may attempt to track these dates as part of the maintenance planning process for a system. Tracking these dates for hundreds of thousands or even millions of parts, or more, may be difficult, especially as the importance of any given part to a system may vary, as may the lifetime of the given part based on the part's usage within the given system.

For example, each individual airplane among thousands of airplanes of a particular type may have a particular kind of part. However, for each of the individual airplanes, the particular kind of part may have different lifetimes that are to be tracked. The problem may become more difficult when tracking all parts for that particularly type of airplane at the desired level of detail. The problem may become more difficult still when tracking different kinds of parts at the desired level of detail among many different kinds of airplanes.

SUMMARY

The illustrative embodiments provide for a lifecycle obsolescence forecasting system. The system may include a data integrator configured to receive part information for a plurality of parts. The part information may include, for the plurality of parts, a number of failures data, stock level data, end of life date data, and end of repair date data. The system also may include a sustainability optimizer configured to receive one or more sustainability requirements for a part in the plurality of parts. The one or more sustainability requirements may be selected from the group consisting of part stock quantity, part sustainment date, part cost, part repair cost, part usage rate, part reliability rate, and part data. The system also may include a forecaster coupled to the data integrator and the sustainability optimizer. The forecaster may be configured to analyze the part information and the one or more sustainability requirements to establish a component stock-out date for the part. The component stock-out date may comprise a date when a last spare of the part is forecast to be removed from stock. The component stock-out date may be established as a function of at least the part usage rate and a corresponding failure rate of the part.

The illustrative embodiments also provide for a method for lifecycle obsolescence forecasting. The method may include receiving, at a processor operating in communication with a non-transitory computer readable storage medium, part information for a plurality of parts. The part information may include, for the plurality of parts, a number of failures data, stock level data, end of life date data, and end of repair date data. The method also may include receiving, at the processor, one or more sustainability requirements for a part in the plurality of parts. The one or more sustainability requirements may be selected from the group consisting of part stock quantity, part sustainment date, part cost, part repair cost, part usage rate, part reliability rate, and part data. The method also may include analyzing, with the processor, the part information and the one or more sustainability requirements to establish a component stock-out date for the part. The component stock-out date may comprise a date when a last spare of the part is forecast to be removed from stock. The component stock-out date may be established as a function of at least the part usage rate and a corresponding failure rate of the part.

The illustrative embodiments also may include a data processing system. The data processing system may include a processor, a bus in communication with the processor, and a memory in communication with the bus. The memory may comprise a non-transitory computer readable storage medium storing instructions which, when executed by the processor, perform a method. The instructions may include instructions for receiving part information for a plurality of parts. The part information may include, for the plurality of parts, a number of failures data, stock level data, end of life date data, and end of repair date data. The instructions also may include instructions for receiving one or more sustainability requirements for a part in the plurality of parts. The one or more sustainability requirements may be selected from the group consisting of part stock quantity, part sustainment date, part cost, part repair cost, part usage rate, part reliability rate, and part data. The instructions also may include instructions for analyzing the part information and the one or more sustainability requirements to establish a component stock-out date for the part. The component stock-out date may comprise a date when a last spare of the part is forecast to be removed from stock. The component stock-out date may be established as a function of at least the part usage rate and a corresponding failure rate of the part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 4 is an illustration of an exemplary user interface for receiving data in a lifecycle obsolescence forecasting tool in accordance with an illustrative embodiment;

FIG. 7 is an illustration of an exemplary output of a lifecycle obsolescence forecasting tool in accordance with an illustrative embodiment;

FIGS. 8A and 8B are illustrations of an exemplary output of a lifecycle obsolescence forecasting tool in accordance with an illustrative embodiment; and FIG. 9 is an illustration of a data processing system in accordance with an illustrative embodiment.

DETAILED DESCRIPTION

Figure 1:
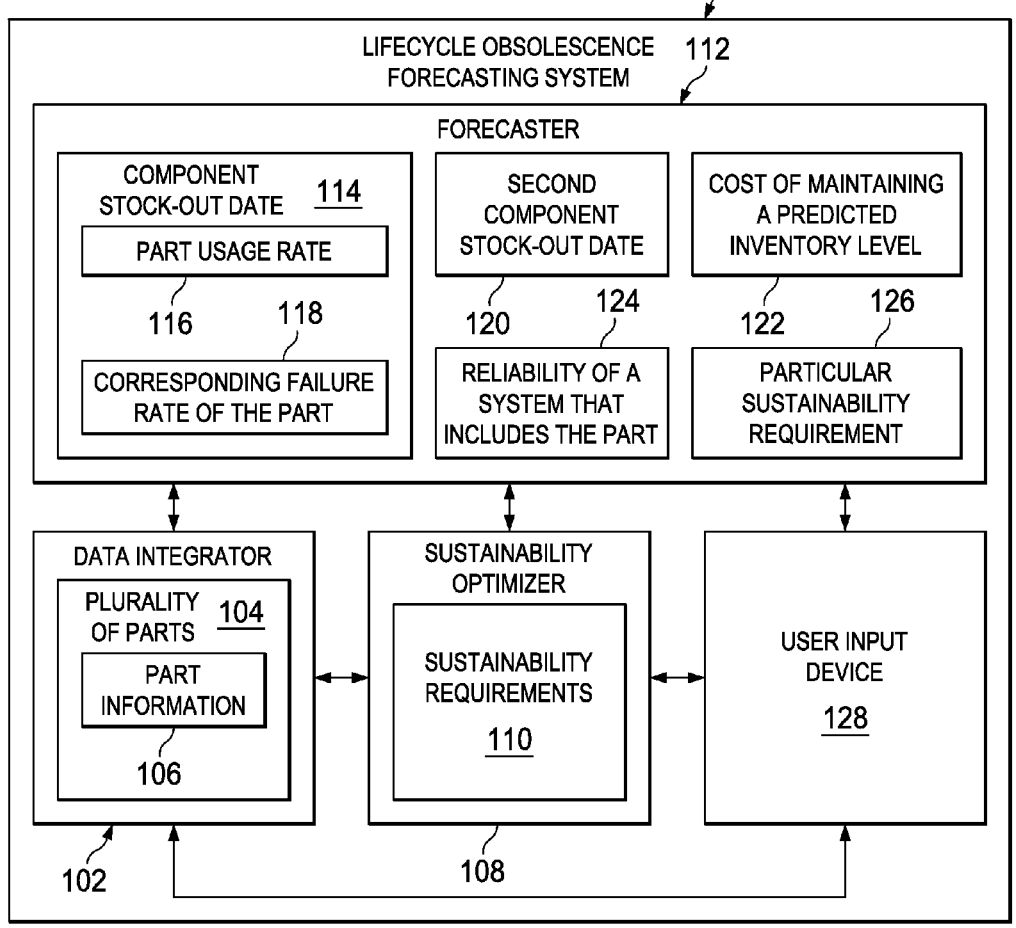
FIG. 1 is a block diagram illustrating a system for lifecycle obsolescence forecasting in accordance with an illustrative embodiment.

The illustrative embodiments recognize and take into account that if an operator seeks to maintain a system past the expected time that the manufacturer will cease production or support for parts for that system, then the operator may desire to plan accordingly. As used herein, a "system" is a physical device comprised of multiple parts, unless otherwise explicitly specified. As an example of planning, the operator may choose to purchase parts in advance to correspond to an expected number of parts needed to equal or exceed an expected lifetime of a system or system type, or may decide to take some other action in furtherance of a mitigation plan.

The illustrative embodiments recognize and take into account that current part management systems may be incapable of automatically determining a component stock-out date or creating adequate part obsolescence mitigation plans. Manual determination of these may be impractical for a system incorporating hundreds of thousands of parts, particularly when parts are tracked individually across thousands of systems.

The illustrative embodiments also recognize and take into account that, prior to this disclosure, no process may have existed to link obsolescence data with sustainment operations and performance of fielded hardware. Furthermore, the illustrative embodiments recognize and take into account that any manual analysis to accomplish such a link would be impractical or impossible for systems with a large number of parts, such as aircraft, especially across large numbers of such systems.

The illustrative embodiments recognize and take into account that other industry forecasting tools, such as, but not limited to, Mitigation of Obsolescence Cost Analysis (MOCA) produced by the UNIVERSITY OF MARYLAND®, may perform forecasting only for types of parts, not individual parts. Furthermore, data presented in this disclosure may be predicted and not representative of individual system performance.

The illustrative embodiments address these and other issues by bringing obsolescence, field reliability, and inventory together for a complete system lifecycle analysis. The illustrative embodiments also may estimate a component stock-out date.

As used herein, the term "component stock-out date" may be defined as a date at which there is no available stock of a component. The term "component stock-out date" also may include a time when serviceability or support for the component is no longer available. The term "component stock-out date" also may be known as "critical dispatch date"; however, with respect to the claimed inventions, the terms "critical", "dispatch date", and "critical dispatch date" may have no meaning other than the definition provided for "component stock-out date".

As used herein, the term "component" may refer to a part, a part type, a piece part, a line replaceable unit, an entire system, or any other part, device, or object having a part-like lifecycle to be tracked. The term "part" and "component" may be considered interchangeable as used herein, such that the two terms are considered to have equivalent meaning. As used herein, the term "system" may refer to any machine or apparatus having two or more components. Thus, the term "system" may not be limited to aircraft or even to vehicles generally, even if an aircraft is used as an example of a "system".

In some illustrative embodiments, a first system may be comprised of multiple secondary systems, with each of the secondary systems being considered "components" of the first system. Additionally, the multiple secondary systems may be comprised of individual components or even tertiary systems. Thus, the term "component stock-out date" is not necessarily limited to one or more "components" but also may apply to one or more "systems" in some cases. The illustrative embodiments also may provide a prioritized list of parts based on obsolescence and available spares or inventory such that parts that are most likely to reach a component stock-out date first are shown first on a list.

The illustrative embodiments may combine current logistics and parts databases. Thus, the illustrative embodiments may not necessarily require a change to current part tracking processes or procedures. Accordingly, the illustrative embodiments may create little or no program execution issues and seamlessly use existing programs. For example, the illustrative embodiments may take as input information from databases, such as an "as designed products and materials list" (ADPML), a "computerized inventory and maintenance management system" (CIMMS), a "supportability management assessment report tool" (SMART™) available from Resource Analysis Corporation, and commercially available obsolescence tools, such as TOTAL PARTS PLUS® available from Total Parts Plus, Inc.

The illustrative embodiments may use real-time data. As a result, the illustrative embodiments may allow for program specific inventory management, diminishing manufacturing source analysis, and field usage analysis rather than relying on averaged industry data. The illustrative embodiments take into consideration the impact of parts analysis on individual systems and individuals parts within individual systems.

The illustrative embodiments may provide a component stock-out date for various parts, part types, piece parts, line replaceable units, and even entire systems. Thus, the illustrative embodiments may provide a data-driven date upon which operation of a system may be affected due to relative unavailability of one or more parts in that system.

The illustrative embodiments may allow for future growth and expansions to multiple software systems through easy-to-use application program interfaces. For example, aspects of the illustrative embodiments may be implemented using existing databases or programming languages.

The illustrative embodiments may calculate desirability ratings for various phases in the lifecycle of a product, including production, maintenance and spares only, spares only, and end of product life. Thus, the illustrative embodiments may produce a complete lifecycle visibility.

The illustrative embodiments may use one or more interactive user interfaces. Thus, the illustrative embodiments may allow for generation of "what if" scenarios to aid in evaluating parts requirements and generation of mitigation plans. In this manner, the illustrative embodiments may provide for schedule and cost optimization.

The illustrative embodiments may provide for prioritization of actions needed or desired based upon data and part performance. Thus, the illustrative embodiments may provide for data driven identification of one or more parts that may affect overall system performance.

The illustrative embodiments also may provide for exportable or printable metrics. For example, the illustrative embodiments may provide a visual timeline of part availability, component stock-out date, user defined and pre-developed report capabilities, and other metrics.

Thus, the illustrative embodiments may provide for a number of capabilities not previously available in the known art. For example, the illustrative embodiments may output predictive timelines, such as that shown in FIG. 7. The illustrative embodiments may output prioritized lists based on which parts will reach a component stock-out date first, such as that shown in FIGS. 8A and 8B. The illustrative embodiments may provide for cost optimization by comparing expected system lifetime to the predicted lifecycles of all parts in the system. The illustrative embodiments also may provide for interactive forecasting adjustments.

FIG. 1 is a block diagram illustrating a system for lifecycle obsolescence forecasting in accordance with an illustrative embodiment. Lifecycle obsolescence forecasting system 100 shown in FIG. 1 may be implemented using one or more data processing systems, possibly in a distributed or networked environment, and possibly by a group of remotely administered data processing systems known as the "cloud". Each of the one or more data processing systems that implement lifecycle obsolescence forecasting system 100 may be data processing system 900 described with respect to FIG. 9 or variations thereof. Lifecycle obsolescence forecasting system 100 may be characterized as including one or more components referenced by individual names. Each of these components may be separate or part of a monolithic architecture, or some components may be combined into one hardware or software system in communication with other components in lifecycle obsolescence forecasting system 100. Lifecycle obsolescence forecasting system 100 may take the form of hardware, software, or a combination thereof.

Lifecycle obsolescence forecasting system 100 may include a number of different components. One component in lifecycle obsolescence forecasting system 100 may be data integrator 102. Data integrator 102 may be configured to receive part information 106 for plurality of parts 104. In an illustrative embodiment, part information 106 may include, for the plurality of parts, a number of failures data, stock level data, end of life date data, and end of repair date data. However, part information 106 may include many other types of part information for any given part, such as a part name, a part identifier, a program in which a part is used, a site where a program is used, a type of system, or an individual system in which a part is used, a quantity of a part, a supplier of a part, a number of work orders for a part, and a mitigation plan for a part. Many other possible examples of part information may be contemplated such that the examples provided above are not necessarily limiting of the claimed inventions.

In an illustrative embodiment, lifecycle obsolescence forecasting system 100 also may include sustainability optimizer 108. Sustainability optimizer 108 may be configured to receive one or more sustainability requirements 110 for a part in plurality of parts 104. The one or more sustainability requirements 110 may be selected from the group consisting of part stock quantity, part sustainment date, part cost, part repair cost, part usage rate, part reliability rate, and part data. However, sustainability requirements 110 may include many other different examples of sustainability requirements, such as part longevity or any of the various examples of part information 106. Thus, the illustrative examples described above with respect to sustainability requirements 110 are not necessarily limiting of the claimed inventions.

In an illustrative embodiment, lifecycle obsolescence forecasting system 100 also may include forecaster 112. Forecaster 112 may be coupled to data integrator 102 and sustainability optimizer 108. Furthermore, in the same or different illustrative embodiments, different components of lifecycle obsolescence forecasting system 100 may be connected to or in communication with each other. Thus, as shown by the arrows in FIG. 1, each of the different components may be connected to one or more of the other components shown in FIG. 1.

In an illustrative embodiment, forecaster 112 may be configured to analyze part information 106 and one or more of sustainability requirements 110 to establish component stock-out date 114 for the part. Component stock-out date 114 may be established by forecaster 112 as a function of at least part usage rate 116 and corresponding failure rate of the part 118.

As indicated above, forecaster 112 may be configured to analyze part information 106 and one or more of sustainability requirements 110 to establish component stock-out date 114 for the part. The process of analyzing may be described as follows.

Forecaster 112 may perform the above analysis by calculating a failure rate and a usage rate based on the number of failures that have occurred compared to the number of years the part in question has been in the system (initial spare date), along with how many spares are available in stock. These calculations may not be straightforward due to the multiplicity of interacting factors when calculating these values. However, calculating these values for each individual part based on fielded data for each part may allow excellent accuracy in determining when each part may be desirably replaced in a system incorporating the part. The component stock-out date then may be forecasted, and thereafter the probability of having to accommodate a system without the part may be calculated and categorized into a green, yellow, and red segment on a timeline created from determining the component stock-out date. In this manner, an overall evaluation of a status for each part may be presented in a pictorial representation.

In an illustrative embodiment, lifecycle obsolescence forecasting system 100 may be further configured to establish second component stock-out date 120 for a second part in plurality of parts 104. In this case, forecaster 112 may be further configured to prioritize component stock-out date 114 relative to second component stock-out date 120 according to a predetermined level of system sustainability for a system that includes both the part and the second part.

In an illustrative embodiment, forecaster 112 may be further configured to estimate cost of maintaining a predicted inventory level 122. Cost of maintaining a predicted inventory level 122 may be a cost that is necessary or desirable to expend in order to achieve a predetermined sustainability of a system that includes the part.

In an illustrative embodiment, forecaster 112 may be further configured to estimate, based on component stock-out date 114, reliability of a system that includes the part 124. Reliability of a system that includes the part 124 may be determined according to at least one of: 1) how often the system will be unavailable due to failure or maintenance of the part, and 2) how long the system will be unavailable due to failure or maintenance of the part.

In an illustrative embodiment, forecaster 112 may be further configured to estimate, based on component stock-out date 114, particular sustainability requirement 126. Particular sustainability requirement 126 may be a sustainability necessary or desirable to maintain a predetermined reliability of a system including the part. In an illustrative embodiment, the predetermined reliability may be characterized as one of continuous operation of the system including the part, uninterrupted operation of the system including the part, and unavailability of the system including the part for a maximum predetermined time.

In an illustrative embodiment, forecaster 112 may be further configured to establish second component stock-out date 120 for a second part in a second plurality of parts. In this case, plurality of parts 104 may comprise a first system, but the second plurality of parts may comprise a second system separate from the first system. The part may be otherwise the same as the second part. In this illustrative embodiment, component stock-out date 114 and second component stock-out date 120 may be determined separately.

In an illustrative embodiment, lifecycle obsolescence forecasting system 100 also may include user input device 128. User input device 128 may be configured to receive a user input relating to the part. In this case, forecaster 112 may be further configured to establish component stock-out date 114 by additionally analyzing the user input.

The illustrative embodiments shown in FIG. 1 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some components. One or more of these blocks may be combined and/or divided into different blocks when implemented in different illustrative embodiments.

Figure 2:
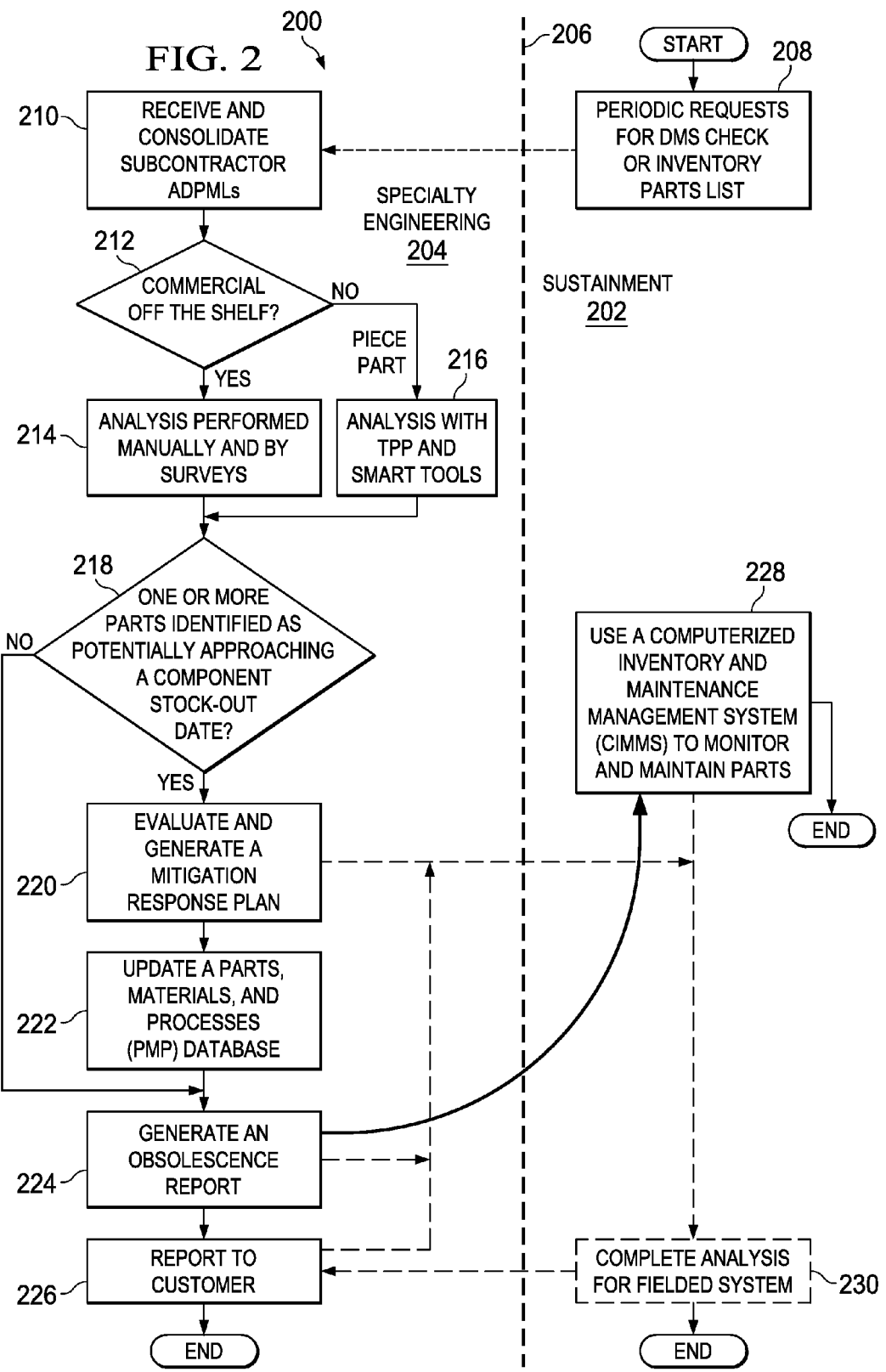
FIG. 2 is a flowchart illustrating a process of lifecycle obsolescence forecasting in accordance with an illustrative embodiment.

FIG. 2 is a flowchart illustrating a process of lifecycle obsolescence forecasting in accordance with an illustrative embodiment. Process 200 may be part of a prior art process for lifecycle obsolescence forecasting. However, process 200 may not necessarily be prior art, as the illustrative embodiments described herein, such as those described with respect to FIG. 1, may be part of process 200. Nevertheless, the illustrative embodiments described herein, such as with respect to FIG. 1 and FIG. 3, might in some instances fully replace process 200 shown in FIG. 2.

Process 200 shown in FIG. 2 may be implemented using a system, such as lifecycle obsolescence forecasting system 100, or by data processing system 900 of FIG. 9. Although the various operations described in FIG. 2 are presented as being performed by two entities, the operations shown in FIG. 2 may be performed by one or more data processing systems operating alone or possibly in a networked environment including, but not limited to, a cloud environment.

In an illustrative embodiment, process 200 may be divided among two entities, including sustainment 202 and specialty engineering 204. Sustainment 202 may be an individual or organization entrusted with sustaining one or more systems. Specialty engineering 204 may be an individual or an organization entrusted with monitoring parts for the one or more systems. However, dividing line 206 between specialty engineering 204 and sustainment 202 may be arbitrary in some instances, and a single entity could perform all operations in process 200. Similarly, multiple additional entities may perform different operations within process 200; still further, some operations in process 200 may be broken up and performed by multiple entities. Thus, sustainment 202, specialty engineering 204, and dividing line 206 are not limiting of the claimed inventions, but are used only as an example of one configuration for process 200 of lifecycle obsolescence forecasting.

In an illustrative embodiment, process 200 may begin with one or more periodic requests for a diminishing manufacturing source (DMS) check or inventory parts list (operation 208). This request in one illustrative embodiment may be made by sustainment 202.

In turn, specialty engineering 204 may receive and consolidate subcontractor "as designed products and materials lists" (ADPMLs) (operation 210). Specialty engineering 204 then may determine whether the "as designed products and materials lists" are commercial off the shelf (COTS) products (operation 212). If yes, then specialty engineering 204 may perform an analysis both manually and by surveys (operation 214). If no, that is, if a piece part is to be analyzed, then specialty engineering 204 may perform the analysis with total parts plus (TPP) and supportability management assessment report tool (SMART) tools (operation 216). "Total parts plus" and "supportability management assessment report tool" may be examples of the illustrative embodiments described herein, such as those described with respect to FIG. 1.

In either case, after either operation 214 or operation 216, specialty engineering 204 may determine whether one or more parts are identified as potentially approaching a component stock-out date (operation 218). Operation 218 may be performed using a parts, materials, and processes (PMP) database. If one or more parts are identified as potentially approaching a component stock-out date, a "yes" decision at operation 218, then specialty engineering 204 may evaluate and generate a mitigation and response plan (operation 220). A mitigation and response plan may be any plan to deal effectively with any issues in a system that may arise as a result of a part approaching or reaching its component stock-out date. For example, a mitigation and response plan may involve purchasing many extra parts of a part type in order to have a future stock of replacement parts, may involve performing maintenance on the part type more frequently, may involve evaluating or finding substitute parts for the system, may involve designing an entirely new system, and may involve many other possible courses of action.

After developing a mitigation and response plan, specialty engineering 204 may update a parts, materials, and processes (PMP) database (operation 222). Updating the PMP database may be performed based on the newly generated mitigation and response plan. Thus, for example, a PMP database may be updated to include new parts requested, to indicate the purchase of additional parts, substitute parts, the development of a new system, and many other types of information.

Thereafter, or perhaps in response to a determination that no parts are identified as potentially approaching a component stock-out date, a "no" determination at operation 218, specialty engineering 204 may generate an obsolescence report (operation 224). An obsolescence report may be a report that describes what parts or part types in a set of systems are approaching or are at a component stock-out date. An obsolescence report may contain many other types of information, such as, but not limited to, at what point on a timeline a part or part type is located relative to a component stock-out date, recommendations presented in the mitigation and response plan generated at operation 220, and highlights of parts or part types that should be addressed on a priority basis.

Specialty engineering 204 then may transmit the obsolescence report to a customer (operation 226) and/or to a computerized inventory and maintenance management system (CIMMS) as indicated at operation 228. In the latter case, sustainment 202 may use a computerized inventory and maintenance management system (CIMMS) to monitor and maintain parts (operation 228). After operation 226, after operation 228, or both, the process may terminate.

However, in an illustrative embodiment, an optional operation may be performed. Specifically, an entity may perform a complete analysis for a fielded system (operation 230). The process may terminate thereafter. As shown by the dashed arrows and dashed operation box at operation 230, this system may be optional and may not be currently available in the known art. Thus, the capability specified at operation 230, among other possible operations described with respect to FIG. 2, may not be currently understood, available, or possible prior to this disclosure. A similar manual analysis of a system also may be impractical or impossible for systems with a large number of parts, such as aircraft.

The system analysis at operation 230 may be, for example, an analysis of the impact of a component stock-out date of a part on an entire system or system type. A non-limiting exemplary analysis for a fielded system may be to determine the impact on a given airplane or airplane type of a component stock-out date of a particular resistor or resistor type used on the airplane or airplane type. In addition, the impact of a given part type in individual systems may be tracked separately and evaluated in those individual systems. For example, a particular rudder type may be maintenanced more frequently in a first airplane relative to a second airplane.

The illustrative embodiments contemplate taking this fact into account when developing a mitigation and response plan, such as in operation 220, or when generating an obsolescence report, such as in operation 224, or when using a computerized inventory and maintenance management system (CIMMS) to monitor and maintain parts, such as in operation 228. Thus, in a specific example, more or fewer rudders may be ordered by an aircraft operator because it is known that the rudder in one specific aircraft is maintenanced more often than in a second specific aircraft.

Thus, the complete analysis for a fielded system, as in operation 230, may include an analysis not only for a given system but also for a plurality of related systems operated by one or more entities. Yet further, the complete analysis for a fielded system at operation 230 may be expanded to contemplate multiple system types. For example, if a given part is used in multiple system types, then the complete analysis may be used in generating mitigation and response plans, generating obsolescence reports, or operating a CIMMS to monitor or maintain parts. In a specific example, a particular resistor type may be used in both a set of airplanes and a set of automobiles maintained and operated by an entity.

A complete analysis at operation 230 may include determining a mitigation and response plan in response to the resistor approaching a component stock-out date with respect to both the set of airplanes and the set of automobiles, possibly considering each airplane and each automobile, and their particular parts, individually. Thus, the illustrative embodiments may provide for a much finer control over desirable inventories and maintenance plans for a plurality of parts than allowable by current parts management software.

The illustrative embodiments shown in FIG. 2 are not meant to imply physical or architectural limitations to the manner in which different illustrative embodiments may be implemented. Other operations in addition to and/or in place of the ones illustrated may be used. Some operations may be unnecessary in some illustrative embodiments. Also, the blocks are presented to illustrate some operations. One or more of these blocks may be combined and/or divided into different blocks when implemented in different illustrative embodiments.

Figure 3:
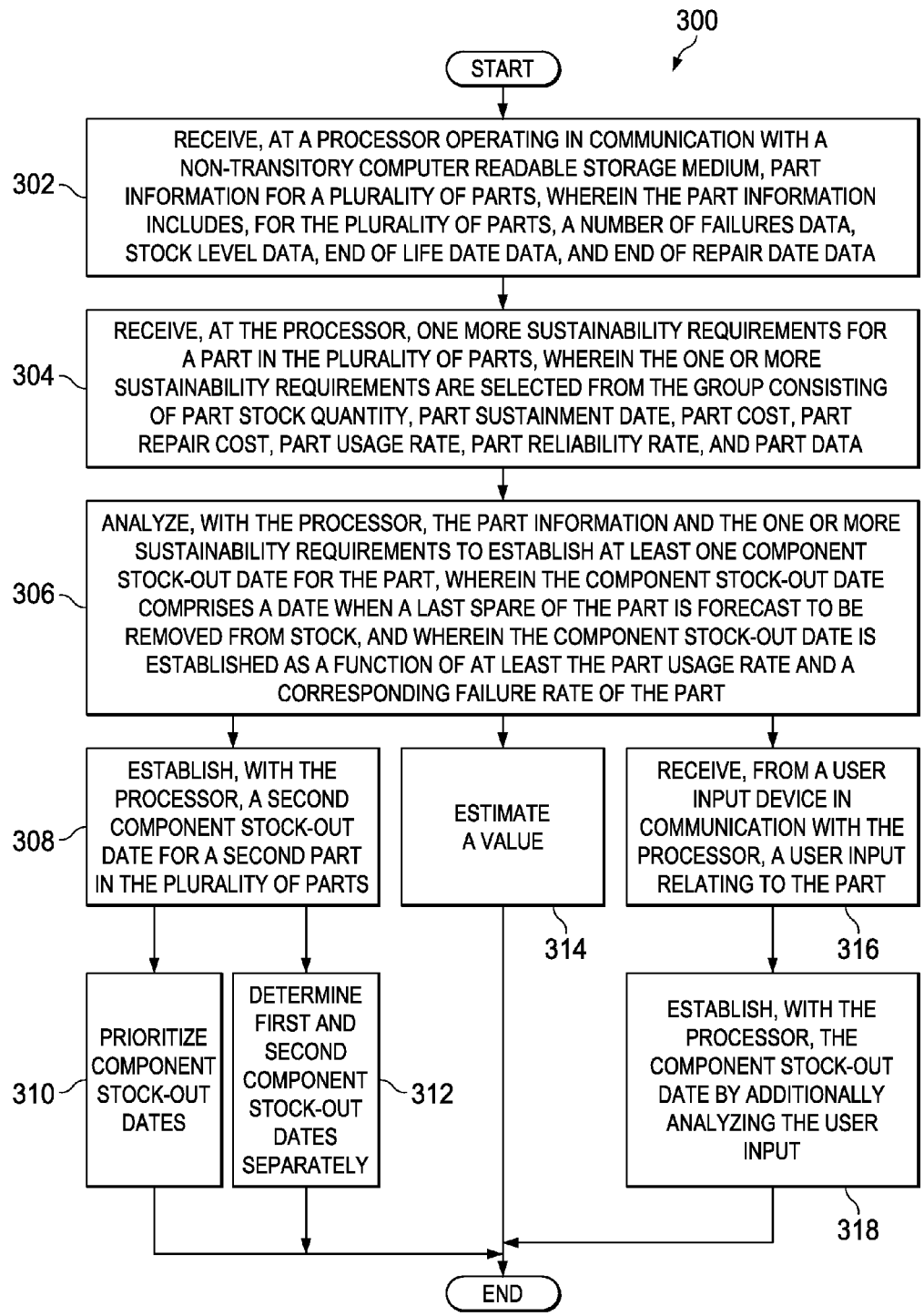
FIG. 3 is a flowchart illustrating a process of lifecycle obsolescence forecasting in accordance with an illustrative embodiment.

FIG. 3 is a flowchart illustrating a process of lifecycle obsolescence forecasting in accordance with an illustrative embodiment. Process 300 shown in FIG. 3 may be an alternative process to process 200 of FIG. 2 or may be a part of one or more operations in process 200 of FIG. 2. Process 300 shown in FIG. 3 may be implemented using a system, such as lifecycle obsolescence forecasting system 100, or by data processing system 900 of FIG. 9. The operations shown in FIG. 3 may be performed by one or more data processing systems operating alone or possibly in a networked environment including, but not limited to, a cloud environment. The operations described in process 300 may be described as being performed by a system, though it is contemplated that the system may include lifecycle obsolescence forecasting system 100 of FIG. 1, data processing system 900 of FIG. 9, or any other processor operating together with a non-transitory computer readable storage medium.

Process 300 may begin with the system receiving, at a processor operating in communication with a non-transitory computer readable storage medium, part information for a plurality of parts, wherein the part information includes, for the plurality of parts, a number of failures data, stock level data, end of life date data, and end of repair date data (operation 302). The system may receive, at the processor, one or more sustainability requirements for a part in the plurality of parts, wherein the one or more sustainability requirements are selected from the group consisting of part stock quantity, part sustainment date, part cost, part repair cost, part usage rate, part reliability rate, and part data (operation 304). The system may then analyze, with the processor, the part information and the one or more sustainability requirements to establish at least one component stock-out date for the part, wherein the component stock-out date comprises a date when a last spare of the part is forecast to be removed from stock, and wherein the component stock-out date is established as a function of at least the part usage rate and a corresponding failure rate of the part (operation 306).

At this point, process 300 may take one of three different paths. More or fewer paths may be present. For example, process 300 may terminate after operation 306, fewer than three different paths may be present, or more alternative paths may be present. Multiple paths may be followed simultaneously or in sequence with respect to each other. Thus, the illustrative embodiment shown in FIG. 3 is not necessarily limiting on the claimed inventions.

In an illustrative embodiment, the system may establish, with the processor, a second component stock-out date for a second part in the plurality of parts (operation 308). Process 300 may take separate paths again thereafter, either alone or together, or perhaps neither separate path need be taken such that process 300 may terminate after operation 308.

In an illustrative embodiment, the system may prioritize component stock-out dates (operation 310). In one illustrative embodiment, the system may prioritize, with the processor, the component stock-out date relative to the second component stock-out date according to a predetermined level of system sustainability for a system that includes both the part and the second part. In another illustrative embodiment, the system then may establish, with the processor, a second component stock-out date for a second part in the plurality of parts. In still another illustrative embodiment, the system may prioritize, with the processor, the component stock-out date relative to the second component stock-out date according to a predetermined level of system reliability for a system that includes both the part and the second part. In any case, after operation 310, process 300 may terminate.

In another illustrative embodiment, after operation 308, the system may determine first and second component stock-out dates separately (operation 312). For example, in an illustrative embodiment, the system may establish, with the processor, a second component stock-out date for a second part in a second plurality of parts, wherein the plurality of parts comprises a first system, wherein the second plurality of parts comprises a second system separate from the first system, wherein the part is otherwise the same as the second part, and wherein the component stock-out date and the second component stock-out date are determined separately. After operation 312, the process may terminate.

Along a different path after operation 306, the system may estimate a value (operation 314). The value may be any value of interest. For example, the system may estimate, with the processor, a cost of maintaining a predicted inventory level of the part that is necessary to achieve a predetermined sustainability of a system that includes the part. In another example, the system may estimate, with the processor, based on the component stock-out date, a reliability of a system that includes the part, wherein reliability is determined according to at least one of: 1) how often the system will be unavailable due to failure or maintenance of the part, and 2) how long the system will be unavailable due to failure or maintenance of the part. In yet another illustrative embodiment, the system may estimate, with the processor, based on the component stock-out date, a particular sustainability requirement necessary to maintain a predetermined reliability of a system including the part. In an illustrative embodiment, the predetermined reliability may comprise one of continuous, uninterrupted operation and unavailability for a maximum predetermined time. In any case, after operation 314, process 300 may terminate.

Along a different path after operation 306, the system may receive, from a user input device in communication with the processor, a user input relating to the part (operation 316). The system then may establish, with the processor, the component stock-out date by additionally analyzing the user input (operation 318). Process 300 may terminate thereafter.

The illustrative embodiments shown in FIG. 3 are not meant to imply physical or architectural limitations to the manner in which different illustrative embodiments may be implemented. Other operations in addition to and/or in place of the ones illustrated may be used. Some operations may be unnecessary in some illustrative embodiments. Also, the blocks are presented to illustrate some operations. One or more of these blocks may be combined and/or divided into different blocks when implemented in different illustrative embodiments.

FIG. 4 is an illustration of an exemplary user interface for receiving data in a lifecycle obsolescence forecasting tool in accordance with an illustrative embodiment. Interface 400 may be an example of a user interface for a software tool used to perform parts management or parts analysis. Interface 400 may be generated by an integrated software tool that implements the various functions and operations described with respect to FIG. 1 through FIG. 3. However, interface 400 may be generated by a stand-alone software tool that only receives information for a parts database. In other illustrative embodiments, interface 400 may be generated by a software tool that implements some of the functions or operations described with respect to FIG. 1 through FIG. 3. Interface 400 may be varied from the illustrative embodiment shown in FIG. 4. For example, more, fewer, or different buttons, dialog boxes, and functionalities may be available in different illustrative embodiments. Thus, the claimed inventions are not necessarily limited to the particular example shown in interface 400.

Interface 400 may include a number of different categories of information. The particular example shown in FIG. 4 shows four types of categories of information. These include boxes represented by hash type "A" 402, hash type "B" 404, hash type "C" 406, and hash type "D" 408. Buttons represented by hash type "A" 402 may represent parts engineering information. Buttons represented by hash type "B" 404 may represent supplier management. Buttons represented by hash type "C" 406 may represent information managed by a responsible engineer or engineers. Buttons represented by hash type "D" 408 may relate to logistics information. Buttons represented without hashing may represent general information or other types of information.

While the term "button" is used with respect to the various labeled boxes shown in FIG. 4, the boxes shown in FIG. 4 may be objects other than buttons. For example, "component stock-out date" 410 might be only a label identifying calculated value 412 of the component stock-out date for the part in question. Similarly, any of the boxes shown in FIG. 4 might be one or more drop down menus selectable by a user by clicking on an area in the box in question.

In use, interface 400 may be used for data entry with respect to one or more parts or components in one or more systems. Thus, for example, a user may interact with button 414 and enter information for the current supplier of a part. A user might interact with any of the buttons shown in FIG. 4 and enter or select information of a type corresponding to the name or identifier given to the button in question.

However, interface 400 is not necessarily limited to data entry. For example, values might be calculated as data is entered, and such calculated values may be displayed on interface 400. In another example, data may be imported from other sources and displayed on interface 400. Thus, the illustrative embodiments shown in FIG. 4 are not necessarily limited to data entry alone.

Figure 5:
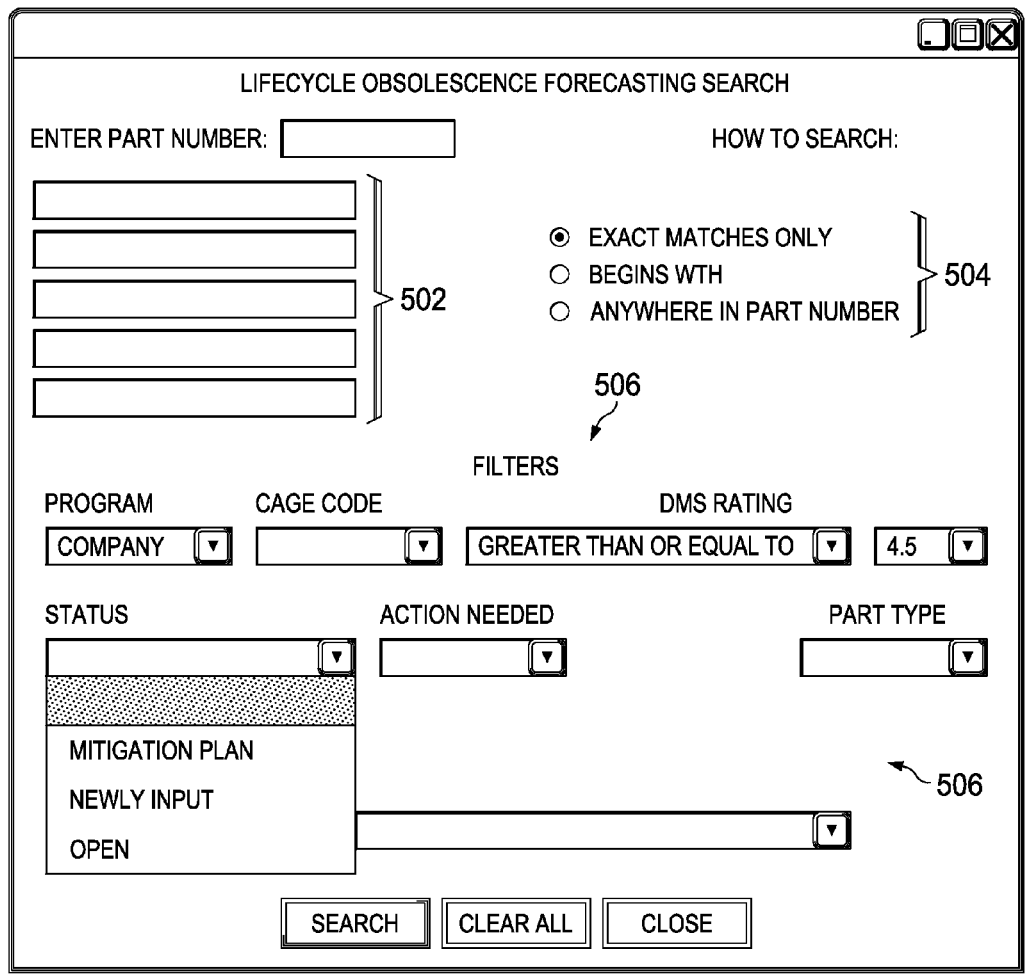
FIG. 5 is an illustration of an exemplary user interface for receiving a query for a lifecycle obsolescence forecasting tool in accordance with an illustrative embodiment.

FIG. 5 is an illustration of an exemplary user interface for receiving a query for a lifecycle obsolescence forecasting tool in accordance with an illustrative embodiment. Interface 500 may be an example of a user interface for a software tool used to perform parts management or parts analysis. Interface 500 may be generated by an integrated software tool that implements the various functions and operations described with respect to FIG. 1 through FIG. 3. However, interface 500 may be generated by a stand-alone software tool that only receives information for a query and then transmits the query to other software. In other illustrative embodiments, interface 500 may be generated by a software tool that implements some of the functions or operations described with respect to FIG. 1 through FIG. 3.

Interface 500 may be varied from the illustrative embodiment shown in FIG. 5. For example, more, fewer, or different buttons, dialog boxes, and functionalities may be available in different illustrative embodiments. Thus, the claimed inventions are not necessarily limited to the particular example shown in interface 500.

Interface 500 may include dialog boxes 502 for receiving input regarding part numbers to be searched. Interface 500 may include selections or dialog boxes 504 for receiving input regarding how to perform a search. Additionally, menus or dialog boxes 506 may be provided for filtering the search. More, fewer, or different buttons, menus, dialog boxes, and selections may be provided.

Figure 6A:
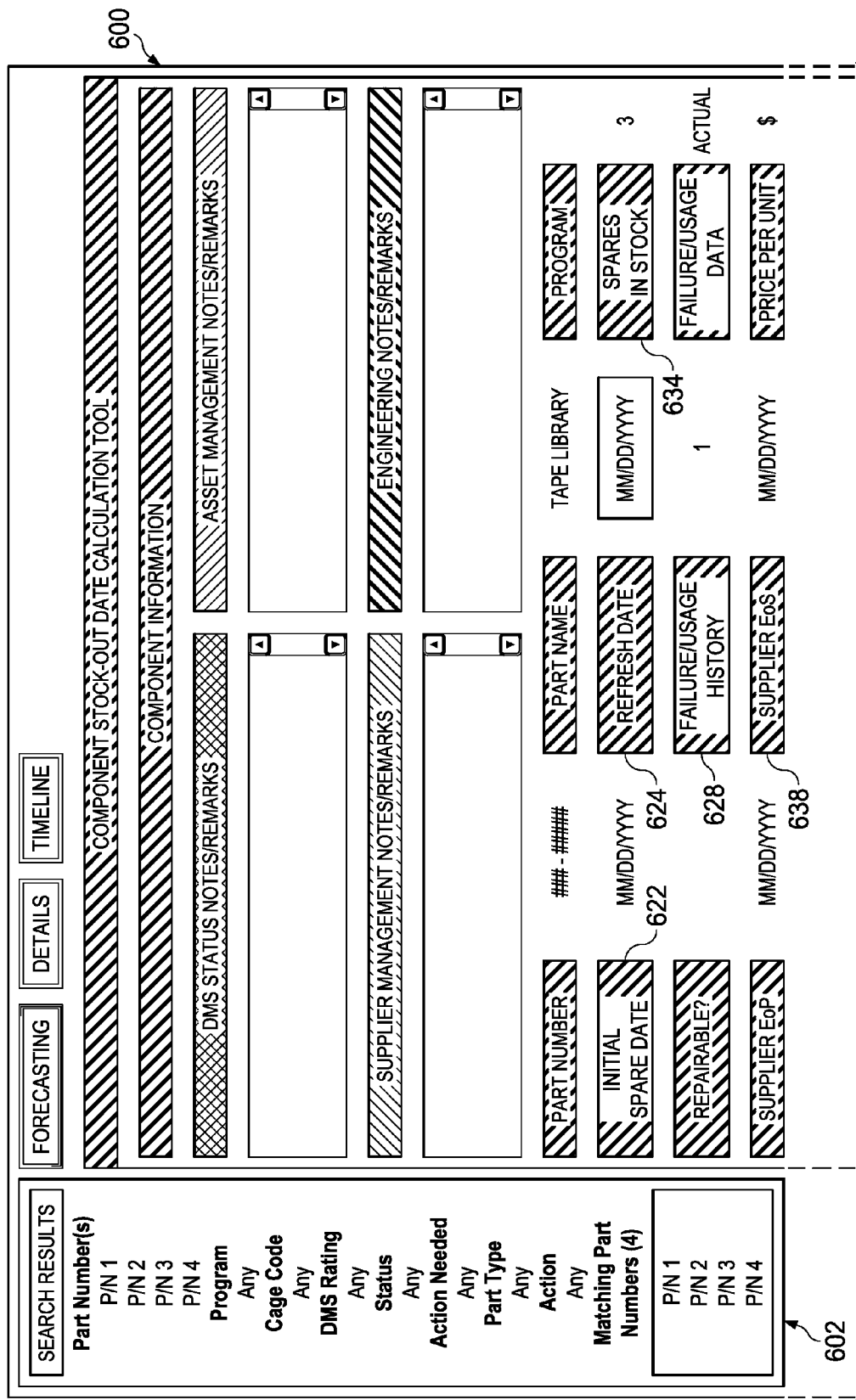
FIGS. 6A and 6B are illustrations of an exemplary user interface for determining a component stock-out date in accordance with an illustrative embodiment.
Figure 6B:
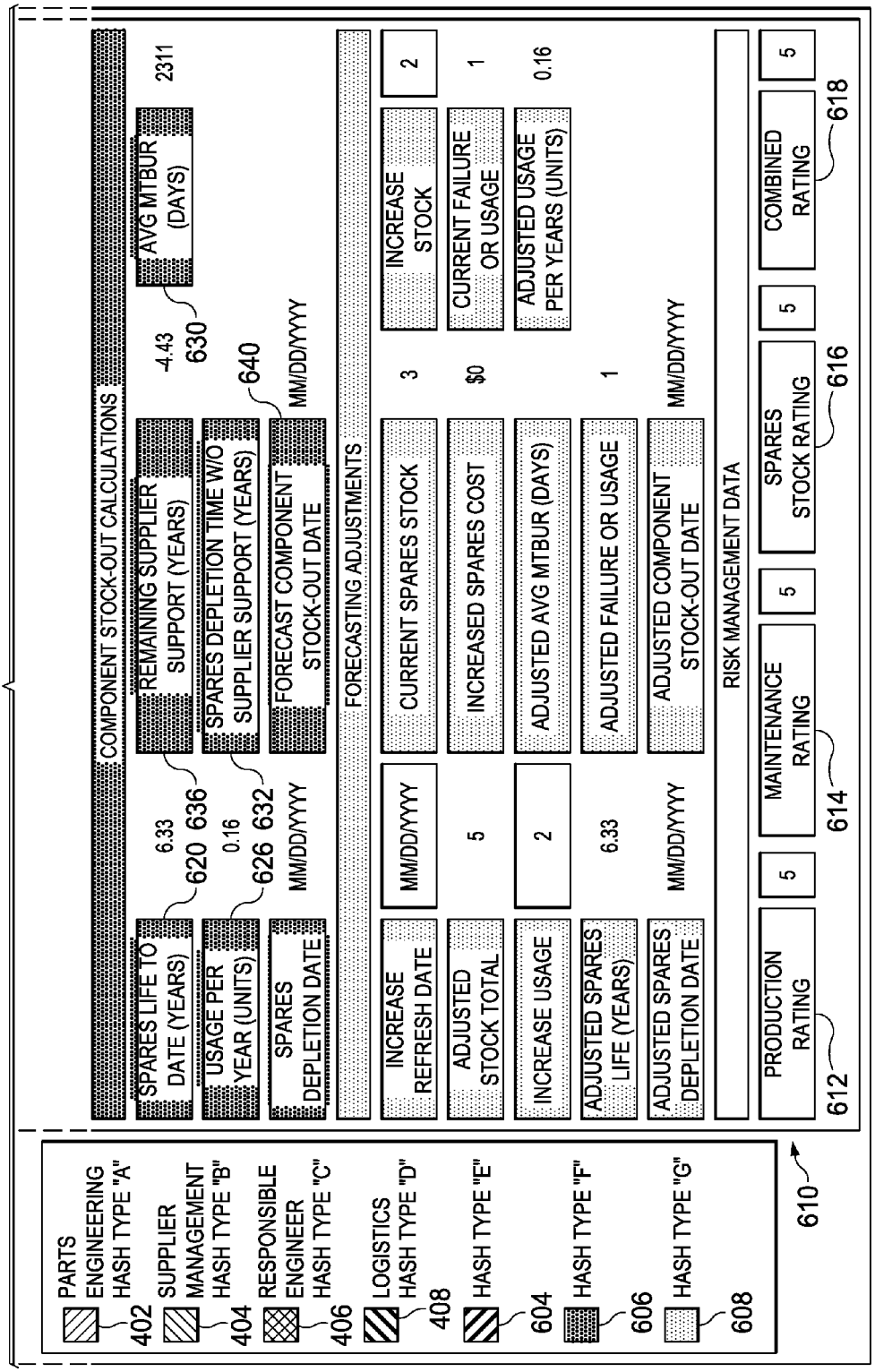

FIGS. 6A and 6B are illustrations of an exemplary user interface for determining a component stock-out date in accordance with an illustrative embodiment. Interface 600 may be an example of a user interface for a software tool used to perform parts management or parts analysis. Interface 600 may be generated by an integrated software tool that implements the various functions and operations described with respect to FIG. 1 through FIG. 3. However, interface 600 may be generated by a stand-alone software tool that only receives information for a query and then transmits the query to other software. In other illustrative embodiments, interface 600 may be generated by a software tool that implements some of the functions or operations described with respect to FIG. 1 through FIG. 3.

Interface 600 may be varied from the illustrative embodiment shown in FIGS. 6A and 6B. For example, more, fewer, or different buttons, dialog boxes, and functionalities may be available in different illustrative embodiments. Thus, the claimed inventions are not necessarily limited to the particular example shown in interface 600.

Interface 600 may be characterized as a component stock-out date calculation tool. Thus, as mentioned above, interface 600 may be used as part of implementing the functions and operations described with respect to FIG. 1 through FIG. 3 with respect to determining a component stock-out date for a part. Interface 600 also may include panel 602 showing search results for a search, possibly implemented using interface 500 of FIG. 5.

Interface 600 shows several acronyms. As used in FIGS. 6A and 6B and elsewhere in the various Figures herein, the term "DMS" refers to "diminishing manufacturing source". The term "P/N" refers to "part number". The term "MM" refers to "month", the term "DD" refers to "day", and the term "YYYY" refers to "year". The term "W/O" refers to "without". The term "EoP" refers to "end of production", which is the date on which production of the part is estimated to end. The term "EoS" refers to "end of support", which is the date on which service of the part is estimated to end. The term "AVG" refers to "average". The term "MTBUR" refers to "mean time between unscheduled removal".

Interface 600 may indicate dialog boxes, display boxes, buttons, labels, and other information using different types of hashing. Hashing might be replaced with coloring in some illustrative embodiments. Hashing may indicate types of information or data represented or requested. For example, hash type "E" 604 may relate to component data as pulled from available sources. Hash type "F" 606 may relate to projected component stock-out dates using available data. Hash type "G" 608 may relate to a forecasting tool for planning and estimating, for example as referred to in operation 220 of FIG. 2 in which a mitigation and response plan is generated, or as referred to in operation 224 of FIG. 2 in which an obsolescence report is generated, or as used in other operations or functions described with respect to FIG. 1 through FIG. 3. Other portions of interface 600 are not represented with hashing. More, fewer, or different arrangements of the various objects shown in interface 600 may be possible.

In an illustrative embodiment, interface 600 may include a variety of ratings 610. The various ratings shown in ratings 610 may represent, at a glance, an overall health or status of a particular part or part type with respect to a corresponding component stock-out date and/or an overall health of a system incorporating the part or part type. The values of ratings 610 are shown as a number between one and five, with one indicating a desirable number and five indicating an undesirable number. However, numbering or evaluation schemes may be used other than the one described with respect to FIGS. 6A and 6B. For example, the scale could be reversed, the scale could be expanded, indicators other than numbers could be used, and many other possible evaluation schemes may be possible.

For example, production rating 612 for the part in question may be "1". Production rating 612 may indicate how long a part or part type will continue in production relative to a lifetime of one or more systems using the part. In another example, maintenance rating 614 for the part in question may be "1". Maintenance rating 614 may indicate how long a part or part type may be maintenanced relative to a lifetime of one or more systems using the part. In another example, spare stock rating 616 for the part in question may be "1". Spare stock rating 616 may indicate how long a stock of spares for a part or part type may be available relative to a lifetime of one or more systems using the part. Combined rating 618 may indicate an overall desirability of a status of a part or part type with respect to a lifetime of one or more systems using the part.

Attention is now turned to how the dispatch calculation tool underlying interface 600 may analyze data to determine a component stock-out date. The illustrative embodiments may describe this process in terms of a system performing the claimed operations. The system may be one or more physical processors operating in conjunction with a non-transitory computer readable storage medium storing computer usable instructions for implementing interface 600 and for implementing the component stock-out date tool.

In a first operation, the system may determine a value for "spares life to date (years)" 620. This value may be determined by subtracting "initial spare date" 622 from "refresh date" 624. In an illustrative embodiment, "initial spare date" 622 may be a date when the part or part type in question was first placed in stock, not necessarily installed in the system.

In a second operation, the system may determine a value for "usage per year (units)" 626. "Usage per year (units)" 626 may be determined by dividing "spares life to date (years)" 620 by a value for "failure/usage history" 628. The inverse of "usage per year (units)" 626 may be a mean time between unscheduled removal (MTBUR), or "AVG MTBUR (days)" 630. This value also may be referred to as "mean time between failures" (MTBF).

In a third operation, the system may determine a value for "spares depletion time w/o supplier support (years)" 632. Again, "w/o" stands for "without". The value for "spares depletion time w/o supplier support (years)" 632 may be calculated by dividing "usage per year (units)" 626 into "spares in stock" 634.

In a fourth operation, the system may determine a value for "remaining supplier support (years)" 636. This value may be determined by subtracting "refresh date" 624 from "supplier EoS" 638. Again, "EoS" refers to an "end of support" date for the part.

In a fifth operation, the system may determine a value for "forecast component stock-out date" 640. This value may be determined by adding "remaining supplier support (years)" 636 to "spares depletion time w/o supplier support (years)" 632.

Note that if "remaining supplier support (years)" 636 is a negative value, then this fact indicates that the end of supplier support for the part is in the past. In this case, "forecast component stock-out date" 640 may default to "spares depletion time w/o supplier support (years)" 632. Otherwise, the component stock-out date may present a false value to the left, decreasing exponentially as the data "refresh date" 624 increases to the right.

Note also that the illustrative embodiments refer to time in terms of days or years, though other measures of time may be used. Further, other terms may be used for the values given above. Thus, again, the example of interface 600 does not necessarily imply any limitations on the claimed inventions.

The illustrative embodiments may combine "forecast component stock-out date" 640 with known historical data to produce lifecycle charts. An example of four lifecycle charts is shown in FIG. 7. Lifecycle charts may provide a "cradle-to-grave" view of each part. More on the lifecycle of parts or part types is described with respect to FIG. 7.

FIG. 7 is an illustration of an exemplary output of a lifecycle obsolescence forecasting tool in accordance with an illustrative embodiment. Output 700 may be an exemplary output of a component stock-out date calculation tool, such as that represented by interface 600 of FIGS. 6A and 6B. Output 700 also may be an output of a device or process, such as described with respect to FIG. 1 through FIG. 3. Output 700 may be produced by a data processing system, such as data processing system 900 of FIG. 9. Output 700 is exemplary only, and may be varied in appearance, color, amount of information presented, and types of information presented.

In an illustrative embodiment, for each of part number 1, part number 2, part number 3, and part number 4, a corresponding timeline is presented along a vertical axis of output 700. Dates expressed in terms of month (January) and year (2000 through 2035) are presented along a horizontal axis of output 700. Optionally, the current date may be represented by vertical line 701 that passes through all of the corresponding timelines shown in output 700.

In an illustrative embodiment, each timeline shown in output 700 may convey information regarding a status for a part or a part type. For example, for part number 1, timeline 702 shows a status of part number 1 from the past, to the present, and an estimated status in the future.

In an illustrative embodiment, different hashing may be used to show different phases of the lifecycle of a part or part type. For example, hash type "H" 704 may indicate a lifecycle phase in which the part or part type is being both produced and maintained. During this production and maintenance phase, it may be assumed that new parts may be ordered or older parts maintained on an as-desired basis. An example of this production and maintenance phase for part number 1 may be indicated at circle 706. In the illustrative embodiment shown, the production and maintenance phase for part number 1 may have expired prior to the current date shown in output 700.

The beginning of the bar filled with hash type "H" 704 may indicate an initial spare stock date or initial availability of a part. The middle of the bar filled with hash type "H" 704 may indicate that it may be assumed that new parts may be ordered or older parts maintained on an as-desired basis. The end of the bar filled with hash type "H" 704 may indicate an end of production date, when the manufacturer no longer produces the part or part type in question.

In another example, hash type "I" 708 may indicate a lifecycle phase in which the part or part type is no longer being produced but may be maintained or serviced by a manufacturer, system operator, or some other maintenance provider. During this maintenance and spares only phase, it may be assumed that new parts might not be readily ordered but that older parts may be maintained or serviced on an as-desired basis. An example of this maintenance and spares only phase for part number 2 on timeline 710 may be indicated at circle 712. In the illustrative embodiment shown, the maintenance and spares only phase for part number 2 expired on or will expire near the current date shown in output 700.

The beginning of the bar filled with hash type "I" 708 may indicate an end of production date for a part or part type, corresponding to the end of the bar filled with hash type "H" 704. The middle of the bar filled with hash type "I" 708 may indicate that new parts might not be readily ordered but that older parts may be maintained or serviced on an as-desired basis. The end of the bar filled with hash type "I" 708 may indicate an end of repair support date when the part or part type in question may no longer be readily repaired, serviced, or supported. Note that if a bar is present with no portion filled with hash type "I" 708, then the end of production (hash type "H" 704) and end of repair support are on the same date.

In another example, hash type "J" 714 may indicate a lifecycle phase in which the part or part type is no longer being produced and no longer may be readily maintained or serviced by a manufacturer, system operator, or some other maintenance provider. During this spares only phase, it may be assumed that new parts might not be readily ordered and that older parts may not be readily maintained or serviced. Thus, during this spares only phase, it may be assumed that if a system needs part number 3, then the part must be taken from the existing stock of spares for part number 3. An example of this spares only phase for part number 3 on timeline 716 may be indicated at circle 718. In the illustrative embodiment shown, the spares only phase for part number 3 began before the current date shown in output 700.

The beginning of the bar filled with hash type "J" 714 may indicate an end of repair support date corresponding to the end of the bar filled with hash type "I" 708. The middle of the bar filled with hash type "J" 714 may indicate that new parts might not be readily ordered and that older parts may not be readily maintained or serviced. Thus, during the middle of the bar filled with hash type "J" 714, it may be assumed that if a system needs a part or part type, then the part or part type must be taken from the existing stock of spares. The end of the bar filled with hash type "J" 714 may indicate a component stock-out date, such as described above, when a part or part type is no longer readily available at all, and when system performance might possibly be impacted.

In another example, the component stock-out date may be shown as the end of a timeline. Again, the component stock-out date is defined as a date when a last spare of the part is forecast to be removed from stock. For example, the component stock-out date for part number 4 may be shown at the end of timeline 720, as further indicated by circle 722. At the component stock-out date, it may be assumed that neither spares nor maintenance for a given part are available. As a result, operation of a system including that part may be affected.

The illustrative embodiments described with respect to output 700 are shown, in part, using hashing. However, in other illustrative embodiments, hashing may be replaced with coloring. For example, the production and maintenance phase shown at hash type "H" 704 might be replaced with the color green. The maintenance and spares only phase shown at hash type "I" 708 might be replaced with the color yellow. The spares only phase shown at hash type "J" 714 might be replaced with the color red. Other schemes for representing the lifecycle of a part may be presented for output 700.

FIGS. 8A and 8B are illustrations of an exemplary output of a lifecycle obsolescence forecasting tool in accordance with an illustrative embodiment. Output 800 may be an exemplary output of a component stock-out date calculation tool, such as that represented by interface 600 of FIGS. 6A and 6B. Output 800 also may be an output of a device or process, such as described with respect to FIG. 1 through FIG. 3. Output 800 may be produced by a data processing system, such as data processing system 900 of FIG. 9. Output 800 is exemplary only, and may be varied in appearance, color, amount of information presented, and types of information presented. Output 800 of FIGS. 8A and 8B may be in addition to or substituted for output 700 of FIG. 7. Output 800 also may be an output as a result of preparation of a mitigation plan, obsolescence report, or computerized inventory and maintenance management system, such as that which might be output as a result of operations 220, 224, or 228 of FIG. 2, respectively.

Output 800 may be a table showing a variety of types of information. The types of information may be arranged in columns, and various different parts or part types may be arranged in rows. Cells in the table represent a particular type of information corresponding to a particular part or part type. Thus, for example, output 800 may include column 802 corresponding to a mitigation plan. Thus, cell 804 may include information relating to a mitigation plan for the part or part type shown in cell 806.

The information shown in output 800 may be varied. More or fewer types of information or parts may be displayed. A user may configure output 800 to show some columns and/or rows, and/or hide other columns and/or rows. However, a useful aspect of output 800 is that a great deal of information relating to a number of parts or part types may be displayed for quick reference by an analyst attempting to determine whether maintenance should be required or additional parts ordered for any given part or part type for any given system or system type.

Yet further, the rows or columns shown in output 800 may be sorted according to various different filtering schemes. For example, the rows in output 800 may be sorted by priority of component stock-out date. Thus, for example, parts or part types requiring more urgent attention before system performance is affected may be displayed first.

FIG. 9 is an illustration of a data processing system in accordance with an illustrative embodiment. Data processing system 900 in FIG. 9 is an example of a data processing system that may be used to implement the illustrative embodiments, such as lifecycle obsolescence forecasting system 100 of FIG. 1 or any other module, system, or process disclosed herein. In this illustrative example, data processing system 900 may include communications fabric 902, which provides communications between processor unit 904, memory 906, persistent storage 908, communications unit 910, input/output (I/O) unit 912, display 914, associative memory 928, data integrator 930, sustainability optimizer 932, and forecaster 934. Processor unit 904 may be characterized as a "physical processor" in that processor unit 904 may be a non-transitory processor.

Associative memory 928 may be a memory that stores relationships, including indirect relationships, among data and also stores data by content rather than by an address. Associative memory 928 need not be in direct communication with communications fabric 902. For example, associative memory 928 may exchange data with processor unit 904 and/or memory 906 via communications unit 910, such as when associative memory 928 is physically located in a remote location relative to data processing system 900.

Data processing system 900 also may include data integrator 930, sustainability optimizer 932, and/or forecaster 934. Data integrator 930 may be data integrator 102 of FIG. 1. Sustainability optimizer 932 may be sustainability optimizer 108 of FIG. 1. Forecaster 934 may be forecaster 112 of FIG. 1. In an illustrative embodiment, data integrator 930, sustainability optimizer 932, and forecaster 934 may be processor unit 904. In an illustrative embodiment, input/output unit 912 may be user input device 128 of FIG. 1.

Processor unit 904 may serve to execute instructions for software that may be loaded into memory 906. Processor unit 904 may be a number of processors, a multi-processor core, or some other type of processor, depending on the particular implementation. "A number," as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 may be examples of storage devices 916. A storage device may be any piece of hardware that is capable of storing information such as data, program code in functional form, and/or other suitable information either on a temporary basis or a permanent basis. Storage devices 916 also may be referred to as computer readable storage devices in these examples. Memory 906, in these examples, may be, for example, a random access memory or any other suitable volatile or non-volatile storage device. Persistent storage 908 may take various forms depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, may provide for communications with other data processing systems or devices. In these examples, communications unit 910 may be a network interface card. Communications unit 910 may provide communications through the use of either or both physical and wireless communications links.

Input/output unit 912 may allow for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 may provide a mechanism to display information to a user.

Instructions for the operating system, applications, and/or programs may be located in storage devices 916, which may be in communication with processor unit 904 through communications fabric 902. In these illustrative examples, the instructions may be in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 may be located in a functional form on computer readable media 920 that is selectively removable and may be loaded onto or transferred to data processing system 900 for execution by processor unit 904. Program code 918 and computer readable media 920 may form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide physical or architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running a program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing a program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices may include, for example, a programmable logic array, programmable array logic, a field programmable logic array, a field programmable gate array, and other suitable hardware devices. With this type of implementation, program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units while other processes may be implemented in the number of processors.

As another example, a storage device in data processing system 900 may be any hardware apparatus that may store data. Memory 906, persistent storage 908, and computer readable media 920 may be examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

The different illustrative embodiments can take the form of an entirely hardware embodiment, an entirely software embodiment, or an embodiment containing both hardware and software elements. Some embodiments may be implemented in software, which includes, but is not limited to, forms such as, for example, firmware, resident software, and microcode.

Furthermore, the different embodiments can take the form of a computer program product accessible from a computer usable or computer readable medium providing a program code for use by or in connection with a computer or any device or system that executes instructions. For the purposes of this disclosure, a computer usable or computer readable medium generally can be any tangible apparatus that can contain, store, communicate, propagate, or transport the program for use by or in connection with the instruction execution system, apparatus, or device.

The computer usable or computer readable medium can be, for example, an electronic, magnetic, optical, electromagnetic, infrared, or semiconductor system, or a propagation medium. Non-limiting examples of a computer readable medium may include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, physical or wireless.

A data processing system suitable for storing and/or executing computer readable or computer usable program code may include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times the code may be retrieved from bulk storage during execution of the code.

Input/output or I/O devices can be coupled to the system either directly or through intervening I/O controllers. These devices may include, for example, keyboards, touch screen displays, and pointing devices. Different communications adapters also may be coupled to the system to enable the data processing system to become coupled to other data processing systems, remote printers, or storage devices through intervening private or public networks. Non-limiting examples are modems and network adapters as just a few of the currently available types of communications adapters.

In summary, the illustrative embodiments allow for each system and its parts to be analyzed on an individual basis given specific data on the particular parts and their usage. There is no guesswork and no averaging of information among part types, but rather utilization of a combination of real data that is usually already collected and stored by various groups in some programs. The illustrative embodiments may be the first tool that collects the data from multiple locations and established databases within a program and brings it together to provide a total picture on the sustainability of a system.

By not requiring use of outside databases for information other than obsolescence, the illustrative embodiments may allow an entity to cut back on the amount of funding spent on outside resources to monitor the sustainability of their parts. Everything regarding parts management and corresponding system health evaluation can be done "in-house" and presented to management or the customer with data driven suggestions providing the best mitigation approach. More importantly, how often a part is repaired or replaced may be tracked and used in the calculations in order to accurately assess how quickly stock levels for that part will diminish.

Other software tools may not look at each part's individual performance or sustainment levels, only at the lifecycles of part types and technology in general. This fact gives the illustrative embodiments the feature of prioritizing within a system the individual parts that will be a problem and suggests how quickly they should be addressed based on the timeline the illustrative embodiments produce before the part becomes an issue to system health. The same system located in different environments or the same part being implemented under different operating conditions in different systems may imply that each part poses a different issue to a system based on numerous factors, not just the type of part it is, and should be analyzed accordingly.

Additionally, the illustrative embodiments may provide the user with an interactive interface where the user can change factors, like usage or stock quantity, and actually be able to see how those factors change the final component stock-out date for that part. This function may help the user determine what the best plan of action is based on where the user wants to specify a particular component stock-out date.

For example, if a part maintains a component stock-out date of Dec. 2, 2011, but the program needs or desires to maintain its systems out to 2025, the user can input the estimated number of stock needed to sustain desired system health to 2025, as well as adjust the failure rate numbers to account for parts failing more often as they get older. Once the required or desired stock levels are determined, the user can decide if ordering that amount of stock is reasonable or if replacing the part with a new one would be a better option. If the choice is to replace the part, then the component stock-out date from the illustrative embodiments may tell the user exactly when a new part should be ordered and installed to avoid an adverse impact of the current part and potential adverse impact to the system.

The illustrative embodiments also provide for a cost option. The cost option may allow for a cost assessment on an individualized level, as each part is evaluated using part specific data, not generalized or averaged data.

The illustrative embodiments also may address the issue of predicting undesirable function of a part within a system using real time data far enough in advance to allow for a proactive approach to be taken with regard to monitoring part and system health. This prediction ability of the illustrative embodiments may save an organization time and money in mitigation efforts.

The illustrative embodiments may combine data that is currently maintained in separate individual databases. Examples of such data bases include parts obsolescence databases (parts database), reliability and failure rates (RAM&T database), and location and stock (logistics database).

The illustrative embodiments may provide a current plus forecasted status for a system based on the impact individual parts pose to a system. Pulling real time data from already established databases may give the illustrative embodiments the feature of not needing to rely on outside resources or personnel. As a result, parts management and corresponding system health management may be completely contained within a given organization.

Thus, the illustrative embodiments represent a data driven tool enabling users to accurately predict the component stock-out date indicating when a specific part or line replaceable unit will become obsolete, when the item is beyond its repair date, and when the item has the greatest potential of performing undesirably with no available spares. This component stock-out date may be determined by algorithms described above, combining obsolescence data, spares stock, failure rates, and end of service/repair dates for specific parts in a system. Providing an accurate component stock-out date for parts allows prioritization of parts desirable to a system's continued sustainability. In this manner, a user may take a proactive approach to avoid undesirable impacts to a maintained system and also avoid undesirably high mitigation costs.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A lifecycle obsolescence forecasting system for maintaining an aircraft comprising:
   a data integrator configured to receive part information for a plurality of parts,
      wherein the part information includes, for the plurality of parts, a number of end of life date data and end of repair date data;
   a sustainability optimizer configured to receive sustainability requirements for a part in the plurality of parts,
      wherein the sustainability requirements consist at least of part stock quantity, part sustainment date, part cost, part repair cost, part usage rate, part reliability rate, and part data;
   a forecaster coupled to the data integrator and the sustainability optimizer, wherein the forecaster is configured to analyze the part information and the sustainability requirements to establish a component stock-out date for the part,
      wherein the component stock-out date comprises a date when a last spare of the part is forecast to be removed from stock, and
      wherein the component stock-out date is established as a function of at least the part usage rate and a corresponding failure rate of the part; and
   monitoring and maintaining a physical inventory of parts based on both the component stock-out date and an expected lifetime of a physical system or a physical system type that includes at least some parts in the physical inventory of parts.

2. The lifecycle obsolescence forecasting system of claim 1, wherein the forecaster is further configured to establish a second component stock-out date for a second part in the plurality of parts, and wherein the forecaster is further configured to prioritize the component stock-out date relative to the second component stock-out date according to a predetermined level of system sustainability for a system that includes both the part and the second part.

3. The lifecycle obsolescence forecasting system of claim 1, wherein the forecaster is further configured to establish a second component stock-out date for a second part in the plurality of parts, and wherein the forecaster is further configured to prioritize the component stock-out date relative to the second component stock-out date according to a predetermined level of system reliability for a system that includes both the part and the second part.

4. The lifecycle obsolescence forecasting system of claim 1, wherein the forecaster is further configured to estimate a cost of maintaining a predicted inventory level of the part that is necessary to achieve a predetermined sustainability of a system that includes the part.

5. The lifecycle obsolescence forecasting system of claim 1, wherein the forecaster is further configured to estimate, based on the component stock-out date, a reliability of a system that includes the part, wherein the reliability is determined according to at least one of how often the system will be unavailable due to failure or maintenance of the part and how long the system will be unavailable due to failure or maintenance of the part.

6. The lifecycle obsolescence forecasting system of claim 1, wherein the forecaster is further configured to estimate, based on the component stock-out date, a particular sustainability requirement necessary to maintain a predetermined reliability of a system including the part.

7. The lifecycle obsolescence forecasting system of claim 6, wherein the predetermined reliability comprises one of continuous operation of the system including the part, uninterrupted operation of the system including the part, and unavailability of the system including the part for a maximum predetermined time.

8. The lifecycle obsolescence forecasting system of claim 1, wherein the forecaster is further configured to establish a second component stock-out date for a second part in a second plurality of parts, wherein the plurality of parts comprises a first system, wherein the second plurality of parts comprises a second system separate from the first system, wherein the part is otherwise the same as the second part, and wherein the component stock-out date and the second component stock-out date are determined separately.

9. The lifecycle obsolescence forecasting system of claim 1 further comprising:
   a user input device coupled to the forecaster, wherein the user input device is configured to receive a user input relating to the part, and wherein the forecaster is further configured to establish the component stock-out date by additionally analyzing the user input.

10. A lifecycle obsolescence forecasting method for maintaining an aircraft, the method comprising:
   receiving, at a processor operating in communication with a non-transitory computer readable storage medium, part information for a plurality of parts used for the aircraft,
      wherein the part information includes, for the plurality of parts, a number of failures data, stock level data, end of life date data, and end of repair date data;
   receiving, at the processor, sustainability requirements for a part in the plurality of parts,
      wherein the sustainability requirements consist at least of part stock quantity, part sustainment date, part cost, part repair cost, part usage rate, part reliability rate, and part data; and
   analyzing, with the processor, the part information and the sustainability requirements to establish a component stock-out date for the part,
      wherein the component stock-out date comprises a date when a last spare of the part is forecast to be removed from stock, and
      wherein the component stock-out date is established as a function of at least the part usage rate and a corresponding failure rate of the part;
   monitoring and maintaining a physical inventory of parts for the aircraft based on both the component stock-out date and an expected lifetime of a physical system or a physical system type that includes at least some parts in the physical inventory of parts.

11. The method claim 10 further comprising:
   establishing, with the processor, a second component stock-out date for a second part in the plurality of parts; and
   prioritizing, with the processor, the component stock-out date relative to the second component stock-out date according to a predetermined level of system sustainability for a system that includes both the part and the second part.

12. The method of claim 10 further comprising:
   establishing, with the processor, a second component stock-out date for a second part in the plurality of parts; and
   prioritizing, with the processor, the component stock-out date relative to the second component stock-out date according to a predetermined level of system reliability for a system that includes both the part and the second part.

13. The method of claim 10 further comprising: estimating, with the processor, a cost of maintaining a predicted inventory level of the part that is necessary to achieve a predetermined sustainability of a system that includes the part.

14. The method of claim 10 further comprising: estimating, with the processor, based on the component stock-out date, a reliability of a system that includes the part, wherein the reliability is determined according to at least one of how often the system will be unavailable due to failure or maintenance of the part and how long the system will be unavailable due to failure or maintenance of the part.

15. The method of claim 10 further comprising: estimating, with the processor, based on the component stock-out date, a particular sustainability requirement necessary to maintain a predetermined reliability of a system including the part.

16. The method of claim 15 wherein the predetermined reliability comprises one of continuous operation of the system including the part, uninterrupted operation of the system including the part, and unavailability of the system including the part for a maximum predetermined time.

17. The method of claim 10 further comprising: establishing, with the processor, a second component stock-out date for a second part in a second plurality of parts, wherein the plurality of parts comprises a first system, wherein the second plurality of parts comprises a second system separate from the first system, wherein the part is otherwise the same as the second part, and wherein the component stock-out date and the second component stock-out date are determined separately.

18. The method of claim 10 further comprising: receiving, from a user input device in communication with the processor, a user input relating to the part; and establishing, with the processor, the component stock-out date by additionally analyzing the user input.

19. A lifecycle obsolescence forecasting system for maintaining an aircraft comprising:
a processor;
a bus in communication with the processor;
a memory in communication with the bus,
wherein the memory comprises a non-transitory computer readable storage medium storing instructions which, when executed by the processor, perform a method,
wherein the instructions comprise:
instructions for receiving part information for a plurality of parts for a physical system type,
wherein the part information includes, for the plurality of parts, a number of end of life date data and end of repair date data; instructions for receiving sustainability requirements for a part in the plurality of parts,
wherein the sustainability requirements consist at least of part stock quantity, part sustainment date, part cost, part repair cost, part usage rate, part reliability rate, and part data;
instructions for analyzing the part information and the sustainability requirements to establish a component stock-out date for the part,
wherein the component stock-out date is selected from the group consisting of a date when the part is forecast to become obsolete, a date when support services for the part are forecast to be no longer readily available at all wherein the part is otherwise serviceable, a date when repair services for the part are forecast to be no longer readily available at all wherein the part is otherwise reparable, a date when spares for the part are forecast to be no longer produced at all, and a date when the spares of the part are forecast to be no longer readily available at all, and wherein the component stock-out date is established as a function of at least the part usage rate and a corresponding failure rate of the part; and
an inventory of physical parts for the physical system type, the inventory being monitored and maintained based on the component stock-out date and an expected lifetime of the physical system type that includes at least some parts in the physical inventory of parts.

20. The system of claim 19, wherein the instructions further comprise:
instructions for estimating, based on the component stock-out date, a particular sustainability requirement necessary to maintain a predetermined reliability of a system including the part; and
wherein the component stock-out date is selected from the group consisting of a date when the part is forecast to become obsolete, a date when support services for the part are forecast to be no longer available at all wherein the part is otherwise serviceable, a date when repair services for the part are forecast to be no longer available at all wherein the part is otherwise reparable, a date when spares for the part are forecast to be no longer produced at all, and a date when the spares of the part are forecast to be no longer available at all.

* * * * *